April 18, 1961 E. C. CRAWFORD 2,980,764
AUTOMATIC GAIN CONTROL CIRCUITS IN TELEVISION RECEIVERS
Filed July 26, 1956
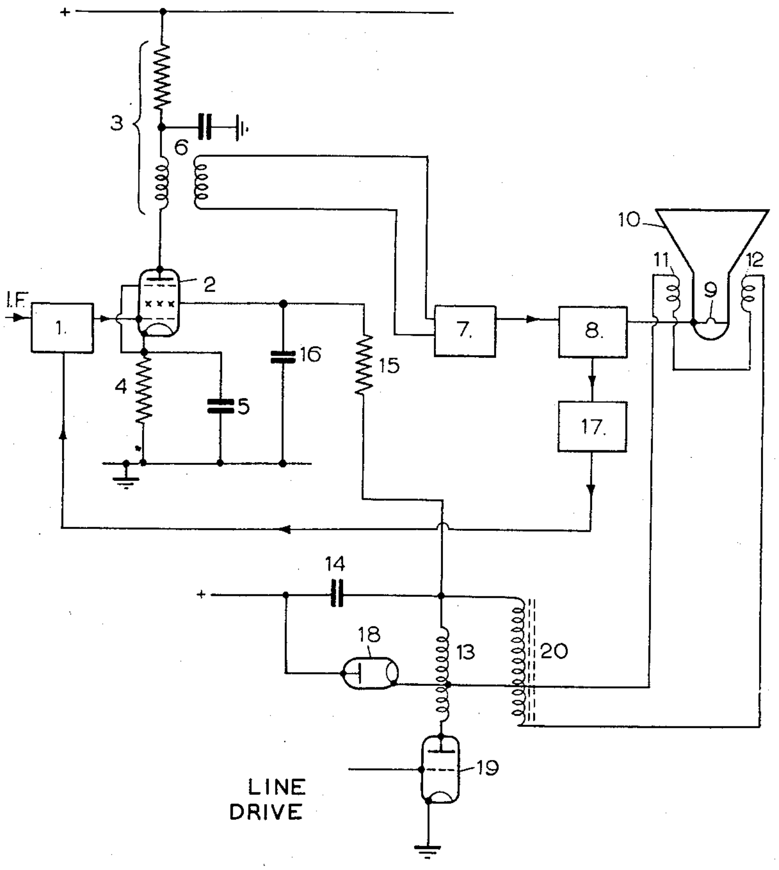
Inventor
E. C. Crawford
By Mascock Downing & Seebold
Attys.

United States Patent Office 2,980,764

Patented Apr. 18, 1961

2,980,764

AUTOMATIC GAIN CONTROL CIRCUITS IN TELEVISION RECEIVERS

Edward Charles Crawford, Southall, England, assignor to Electric & Musical Industries Limited, Middlesex, England, a company of Great Britain Filed July 26, 1956, Ser. No. 600,340

Claims priority, application Great Britain Aug. 3, 1955

3 Claims. (Cl. 178—7.5)

This invention relates to automatic gain control circuits in television receivers.

Various proposals have been made for effecting control of picture signal amplitude in television receivers. According to some of these proposals the gain control signal is derived from the received signal after demodulation thereof and is employed to control the amplification of received signals prior to demodulation thereof. For example the gain control signal may be responsive to the mean value of the picture signal (that is the mean brightness of the picture) or may be responsive to the average level of recurrent datum portions of the received signal. From the point of view of television reception such automatic gain control has many advantages but one practical disadvantage encountered is that the receiver may become blocked when first switched on a strong signal, for example on switching on the receiver or on switching the receiver over from a relatively weak signal. This disadvantage arises because there is, inevitably, time delay in the automatic gain control circuit due to the presence of smoothing capacity and on first switching to a strong signal the high gain which prevails initially may result in overloading one or more valves prior to the demodulator, especially the final intermediate frequency amplifier valve, to such an extent that the modulation is substantially suppressed or reduced and the operation of the automatic gain control circuit is thereby inhibited. The overload condition tends therefore to persist.

The object of the present invention is to reduce the disadvantage indicated.

According to the present invention there is provided, a television receiver comprising means for providing from received energy a carrier wave amplitude-modulated by a video signal, a multi-stage amplifier for said carrier wave, a demodulator for demodulating the amplified output of said amplifier to derive a video signal, a display tube, and a video amplifier for amplifying the video signal derived by said demodulator and applying the amplified video signal to said display tube, means for deriving a gain control signal in response to the demodulated video signal, and a gain control circuit responsive to said control signal to control the gain for at least one stage of said multi-stage amplifier, the final stage of said multi-stage amplifier comprising a valve having a cathode, a control electrode to which the amplitude-modulated carrier wave is applied, an output electrode coupled to said demodulator, and a further electrode disposed between said control electrode and said output electrode, a source of positive polarising potential, an output impedance device connecting said source to said output electrode, a further source of substantially higher polarizing potential, and a further impedance device connecting said further source to said further electrode, said further impedance device and said higher polarizing potential having dimensions to constitute means responsive to current variations in said valve for counteracting a tendency for said valve to be overloaded in the absence of said gain control signal.

Preferably said further source of potential for said further electrode comprises a boosted high tension generator used in the line scanning circuit of the receiver.

In a particular form of the invention said control signal is responsive to the average value of the picture signal.

In order that the invention may be clearly understood and readily carried into effect, the invention will be described with reference to the single figure of the accompanying drawing.

In this figure, which shows in part the circuit of a broadcast television receiver, broadcast television signals including vision signals and sound signals are received by an aerial and fed via a feeder to a radio frequency amplifier and thence to a frequency changer, none of which are shown. The vision signals are then fed into the first stages of an intermediate frequency amplifier, which are represented by block 1, and from there to the control electrode of the last stage of the intermediate frequency amplifier consisting of valve 2 with anode load 3 and cathode biased by resistor 4 with by-pass condenser 5.

The output of this last intermediate frequency stage is fed by transformer 6, forming part of the anode load 3, to a detector and then to a vision amplifier, which are represented by blocks 7 and 8 respectively, which latter feeds the cathode 9 of the cathode ray tube 10 in known manner.

Part of the signal output of vision amplifier 8 is applied to an automatic gain control circuit represented in general by the block 17. This circuit may be arranged for example to derive a control signal responsive to the average level of the picture signals and thus to the mean brightness of the scene which would, in the absence of the gain control, be depicted on the screen of the cathode ray tube 10. The output of the circuit 17 is applied in known manner to vary the bias of the first intermediate frequency amplifying stages in the circuit 1.

The lower part of the circuit shown in the figure is the output stage of the line sawtooth generator which energises the line deflecting coils 11 and 12 of the cathode ray tube 10, via auto-transformer 13. Boosted high tension is obtained from the normal high tension source denoted by the + sign and the potential across condenser 14 in the usual manner, the condenser being charged during a first part of each long flank of each line deflecting waveform when the damping diode 18 is conducting and the driving valve 19 is switched off. The inductance 20 is used for linearising purposes, and the remaining part of the line sawtooth generator is conventional and is not shown.

In accordance with the invention and in order to reduce any tendency for the automatic gain control circuit 17 to become blocked and thereby allow prolonged overloading of the final intermediate frequency valve and possibly the vision amplifier valves it is arranged that any tendency to overload causes the application of a potential to the screen electrode of valve 2, considerably negative of the normal operating potential of said screen electrode. For this purpose the screen electrode of the valve 2 is connected to a source of potential which is positive with respect to the source of potential for the anode via a large value resistor 15, in conjunction with decoupling condenser 16. Thus the source of potential for the screen electrode of the valve 2 is the boosted source provided by the condenser 14 in conjunction with the normal high tension source of the receiver, whereas the potential source for the anode is merely the normal high tension source. The values of the potential source for the screen electrode and of the resistor 15 are chosen such that under all normal operating conditions the screen electrode is at its usual potential but when the circuit is first switched into operation or a tendency to overload develops at any other time the screen potential drops to nearly half the usual value due to the large voltage drop produced across the large resistor 15 by the increased screen current which flows when the valve 2 tends to become overloaded. The condition of low screen potential is maintained until the automatic gain control circuit becomes operative in normal manner to rectify the conditions tending to produce overload.

This has the double advantage of preventing that blocking which is due to the anode of the valve 2 saturating and thereby suppressing the modulation under overload conditions and of preventing the screen dissipation from exceeding safe limits. The circuit also has the advantage that the tendency for overloading to occur on first switching on is reduced by virtue of the fact that until the condenser 14 becomes charged, the gain of the valve is maintained lower than the gain which prevails when the condenser 14 becomes charged.

In a practical form of the circuit, in which the valve 2 is an EF 80 (British type valve), the resistor 15 may be 100,000 ohms. The boosted high tension may be 475 volts whereas the normal high tension fed to the anode of the valve 2 may be 200 volts. The effective anode load impedance of the valve at intermediate frequency may be 10,000 ohms.

The circuit 17 may be other than of the kind which derives a control signal in response to the average value of a received signal. For example it may derive a control signal in response to the average level of recurrent datum portions of a received signal or by peak rectifying a received signal before or after cancellation of the synchronising pulses.

What I claim is:

1. A television receiver comprising means for providing from received energy a carrier wave amplitude-modulated by a video signal, a multi-stage amplifier for said carrier wave, a demodulator for demodulating the amplifier output of said amplifier to derive a video signal, a display tube, and a video amplifier for amplifying the video signal derived by said demodulator and applying the amplified video signal to said display tube, means for deriving a gain control signal in response to the demodulated video signal, and a gain control circuit responsive to said control signal to control the gain for at least one stage of said multi-stage amplifier, the final stage of said multi-stage amplifier comprising a valve having a cathode, a control electrode to which the amplitude-modulated carrier wave is applied, an ouput electrode coupled to said demodulator, and a further electrode disposed between said control electrode and said output electrode, a source of positive polarizing potential, an output impedance device connecting said source to said output electrode, a further source of substantially higher polarizing potential, and a further impedance device connecting said further source to said further electrode, said further impedance device and said higher polarizing potential having dimensions to constitute means responsive to current variations in said valve for counteracting a tendency for said valve to be overloaded in the absence of said gain control signal.

2. A television receiver according to claim 1 including a boosted high tension generator for a scanning circuit of said display tube wherein said boosted high tension generator is used as said further source of polarizing potential.

3. A television receiver according to claim 1 wherein said means for deriving a gain control signal in response to the output of said video amplifier comprises a gain control signal generator which is responsive to an average value of said video signal.

References Cited in the file of this patent

UNITED STATES PATENTS

| | | |
|---|---|---|
| 2,214,846 | Wilson | Sept. 17, 1940 |
| 2,356,141 | Applegarth | Aug. 22, 1944 |
| 2,801,364 | Janssen | July 30, 1957 |
| 2,880,271 | Kroger | Mar. 31, 1959 |